(12) United States Patent
Ni et al.

(10) Patent No.: US 10,499,213 B2
(45) Date of Patent: Dec. 3, 2019

(54) CHARGING METHOD, CONTROL PLANE NETWORK ELEMENT, FORWARDING PLANE NETWORK ELEMENT, AND CHARGING SYSTEM

(71) Applicant: Huawei Technologies Co., Ltd., Shenzhen (CN)

(72) Inventors: Hui Ni, Beijing (CN); Yongcui Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/983,892

(22) Filed: May 18, 2018

(65) Prior Publication Data
US 2018/0270629 A1 Sep. 20, 2018

Related U.S. Application Data

(63) Continuation of application No. PCT/CN2015/095167, filed on Nov. 20, 2015.

(51) Int. Cl.
*H04W 4/24* (2018.01)
*H04M 15/00* (2006.01)
*H04L 12/14* (2006.01)

(52) U.S. Cl.
CPC ............ *H04W 4/24* (2013.01); *H04L 12/14* (2013.01); *H04L 12/1407* (2013.01);
(Continued)

(58) Field of Classification Search
CPC . H04L 12/14; H04L 12/1407; H04L 12/1403; H04L 12/141; H04L 12/1421;
(Continued)

(56) References Cited

U.S. PATENT DOCUMENTS 8,009,573 B2 * 8/2011 Duan .......................... 370/252
9,451,095 B2 * 9/2016 Kahn et al. .......... H04M 15/58
(Continued)

FOREIGN PATENT DOCUMENTS

CN 104104520 A 10/2014
CN 104221418 A 12/2014
(Continued)

OTHER PUBLICATIONS

KR 10-2018-7014521, Office Action, dated Jun. 20, 2019.

*Primary Examiner* — Meless N Zewdu
(74) *Attorney, Agent, or Firm* — Leydig, Voit & Mayer, Ltd.

(57) ABSTRACT

A charging method is provided. The method includes the following: A forwarding plane network element sends forwarding plane charging statistics to a charging system when the forwarding plane charging statistics meet a preset charging trigger condition, and may further send a charging context identifier to the charging system; the charging system actively sends control plane charging request information to a control plane network element after receiving the forwarding plane charging statistics; the control plane network element sends control plane charging information to the charging system after receiving the request information, and may further send the charging context identifier; and the charging system associates the forwarding plane charging statistics with the control plane charging information based on the charging context identifier, and performs charging processing.

18 Claims, 9 Drawing Sheets

(52) U.S. Cl.
CPC ........... *H04M 15/41* (2013.01); *H04M 15/58* (2013.01); *H04M 15/62* (2013.01); *H04M 15/64* (2013.01); *H04M 15/65* (2013.01); *H04M 15/785* (2013.01); *H04M 15/852* (2013.01); *H04M 15/853* (2013.01); *H04M 15/854* (2013.01); *H04M 15/60* (2013.01)

(58) Field of Classification Search
CPC ........ H04L 12/1446; H04L 2012/5639; H04M 15/58; H04M 15/62; H04M 15/785; H04M 15/852; H04M 15/854; H04M 15/41; H04M 15/60; H04M 15/64; H04M 15/65; H04M 15/853; H04M 15/00; H04M 15/12; H04M 15/14; H04M 15/16; H04M 15/28; H04M 15/39; H04M 15/44; H04M 15/43; H04M 15/67; H04M 15/80; H04M 15/82; H04M 2215/01; H04M 2215/0104; H04M 2215/0176; H04M 2215/44; H04M 2215/0188; H04M 2215/14; H04M 2215/146; H04M 15/70; H04M 15/66; H04M 15/857; H04W 4/24; H04W 12/0013; H04W 12/0017; G06Q 30/0247; G06Q 30/0254; G06Q 30/0255; G06Q 2220/12
USPC ................ 705/34, 52, 77, 909; 455/406–408
See application file for complete search history.

(56) References Cited

U.S. PATENT DOCUMENTS

| | | | |
|---|---|---|---|
| 9,641,958 B2* | 5/2017 | Lehane et al. | H04W 4/005 |
| 9,692,912 B2* | 6/2017 | Cai et al. | H04M 15/67 |
| 9,763,229 B2* | 9/2017 | Kim et al. | H04W 72/0406 |
| 9,838,904 B1* | 12/2017 | Bayar et al. | H04W 28/0263 |
| 2004/0167834 A1* | 8/2004 | Koskinen et al. | 705/30 |
| 2013/0114460 A1* | 5/2013 | Rubio Vidales et al. | H04W 24/04 |
| 2014/0213278 A1* | 7/2014 | Jin et al. | H04W 28/085 |
| 2015/0110095 A1* | 4/2015 | Tan et al. | H04W 40/02 |
| 2015/0319315 A1 | 11/2015 | Chai et al. | |
| 2016/0006883 A1 | 1/2016 | Cartmell | |
| 2016/0036597 A1 | 2/2016 | Liu et al. | |
| 2016/0174055 A1 | 6/2016 | Wang et al. | |
| 2018/0262930 A1* | 9/2018 | De Silva et al. | H04W 24/08 |

FOREIGN PATENT DOCUMENTS

| | | |
|---|---|---|
| CN | 104301881 A | 1/2015 |
| CN | 104378749 A | 2/2015 |
| KR | 20150119420 A | 10/2015 |
| WO | 2014110719 A1 | 7/2014 |
| WO | 2014169877 A1 | 10/2014 |

* cited by examiner

CHARGING METHOD, CONTROL PLANE NETWORK ELEMENT, FORWARDING PLANE NETWORK ELEMENT, AND CHARGING SYSTEM

CROSS-REFERENCE TO RELATED APPLICATIONS

This application is a continuation of International Application No. PCT/CN2015/095167, filed on Nov. 20, 2015, the disclosure of which is hereby incorporated by reference in its entirety.

TECHNICAL FIELD

Embodiments of the present invention relate to the field of communications technologies, and in particular, to a charging method, a control plane network element, a forwarding plane network element, and a charging system.

BACKGROUND

Charging is a cost calculation system established by an operator to measure a network resource usage of a user based on a specific tariff policy. A packet switched network of an evolved packet core (EPC) supports two charging systems defined by the 3rd Generation Partnership Project (3GPP): an online charging system (OCS) and an offline charging system (OFCS). Online charging is implemented through interaction between a Gy interface and the OCS; and offline charging is implemented through interaction between a Ga interface and a CG. The charging system generates a user charging data record (CDR) and performs user rate settlement based on collected charging information.

Separation between control and forwarding is a most basic design idea in a gateway architecture design. Functions of a gateway are classified into two parts: a gateway controller (Gateway-Controller Plane, GW-C for short) and a gateway user plane (GW-U), which are respectively corresponding to a control plane and a forwarding plane of the gateway. The GW-C is mainly responsible for user access, policy control, and charging CDR management. The GW-U is mainly responsible for forwarding data, and implementing control and charging policies that are delivered by the control plane. The charging system reads statistics of the user on network resource usage and implements a charging function.

Currently, a disclosed charging method (an example in which a forwarding plane charging statistics report process triggered by the offline charging and the forwarding plane is used) mainly includes the following steps.

1. The GW-C sends a charging rule to the GW-U, where the charging rule carries a charging context identifier parameter.

The charging rule is a basis for charging, and is obtained by the GW-C from a policy and charging rules function (PCRF), or obtained from charging characteristics based on configuration mapping.

The charging context identifier parameter may be a service flow identifier, such as a UE IP, an IP 5-tuple of a service flow, or an identifier that has a packet header feature.

2. The GW-U sends forwarding plane charging statistics and the charging context identifier to the GW-C when a GW-U trigger condition occurs, for example, when a time/volume/service threshold is reached.

3. The GW-C associates the forwarding plane charging statistics with forwarding plane status information based on the charging context identifier, and generates a CDR.

4. The GW-C sends the CDR to the charging system.

A reporting path of the forwarding plane charging statistics in the conventional art is: GW-U→GW-C→charging system. The path is relatively long, and a transmission delay of the forwarding plane charging statistics is relatively high. Consequently, a charging delay is relatively high.

SUMMARY

The present invention provides a charging method, a control plane network element, a forwarding plane network element, and a charging system, so that a report of forwarding plane charging statistics is directly sent from the forwarding plane network element to the charging system, thereby reducing a charging delay.

A first aspect of the present invention provides a charging method, including: first collecting, by a forwarding plane network element, charging statistics; and sending, by the forwarding plane network element, forwarding plane charging statistics to a charging system, so that the charging system performs charging processing based on the forwarding plane charging statistics and control plane charging information.

In the technical solution, an interface between the forwarding plane network element and the charging system is added, so that a report of the forwarding plane charging statistics is directly sent from the forwarding plane network element to the charging system, thereby reducing a charging delay.

The charging system includes an offline charging system or an online charging system. The charging processing may include offline charging CDR generation or online charging quota authorization. The offline charging CDR generation is completed by the offline charging system, and the online charging quota authorization is processed by the online charging system.

The forwarding plane network element may collect the charging statistics based on a charging rule. The charging rule is a basis for charging, and may be obtained from the control plane network element by the charging system, or from charging characteristics based on configuration mapping, and then is sent to the forwarding plane network element. Certainly, the charging rule may also be delivered by the control plane network element by using an interface between the control plane network element and the forwarding plane network element.

The forwarding plane charging statistics include the forwarding plane charging statistics. The forwarding plane charging statistics are measurement information of the forwarding plane network element based on a network resource use of a user.

Optionally, the forwarding plane network element further sends a charging context identifier to the charging system, where the charging context identifier may be at least one of a service flow identifier, IP information of a service flow, or a charging group or a rate identifier associated with one or more to-be-charged service flows.

If the charging system is an online charging system, the forwarding plane charging statistics are quota request information, where the quota request information is used to apply to the online charging system for a new quota.

The control plane charging information may be understood as status information of the control plane network element, for example, QoS information, user location information, and service policy and charging control information. If the charging system is an online charging system, the control plane charging information may be further understood as re-authentication request information.

In an optional implementation, the forwarding plane charging statistics are sent by the forwarding plane network element when the forwarding plane charging statistics meet a preset charging trigger condition.

If the charging system is an offline charging system, the preset charging trigger condition may include the following: The forwarding plane charging statistics reach a time threshold or a volume threshold, or reach a rate switching moment.

If the charging system is an online charging system, the preset charging trigger condition may include quota exhaustion, reaching quota valid duration, reaching quota idle duration, or the like. In addition, if the charging system is an online charging system, the forwarding plane charging statistics are used to apply to the online charging system for a new quota. In this case, the forwarding plane charging statistics may be obtained by using a credit control request message of the Diameter protocol.

In specific implementation, the forwarding plane network element sends the forwarding plane charging statistics to the charging system when the forwarding plane charging statistics meet the preset charging trigger condition. Optionally, the forwarding plane network element may further send the charging context identifier to the charging system. After receiving the forwarding plane charging statistics, the charging system actively sends control plane charging request information to the control plane network element when there is no control plane charging information corresponding to the charging context identifier in the charging system. The control plane network element sends the control plane charging information to the charging system after receiving the control plane charging request information. The charging system performs the charging processing based on the forwarding plane charging statistics and the control plane charging information.

Further, if the charging system is an online charging system, the charging system further sends quota authorization information to the forwarding plane network element after completing the charging processing. The quota authorization information may be an quota authorization parameter. The quota authorization information may be obtained by using the credit control request message of the Diameter protocol.

In another optional implementation, the forwarding plane network element receives charging statistics collection request information sent by the charging system, where the charging statistics collection request information is sent by the charging system after receiving a first control plane message sent by a control plane network element.

If the QoS changes, or the user location information changes, or a user access mode changes, for example, 3G radio access is switched to 4G radio access, the control plane network element may consider that the control plane charging information changes.

In specific implementation, the control plane network element may send the first control plane message to the charging system when the control plane charging information changes. The charging system actively sends the charging statistics collection request information to the forwarding plane network element after receiving the first control plane message. The forwarding plane network element sends the forwarding plane charging statistics to the charging system after receiving the charging statistics collection request information.

Optionally, the first control plane message may further include the control plane charging information before the change or control plane charging information after the change. If the first control plane message does not include the control plane charging information, after receiving the forwarding plane charging statistics, the charging system may request the control plane network element to obtain the control plane charging information.

Further, if the charging system is an online charging system, the charging statistics collection request information may be further used to notify the forwarding plane network element that a control plane charging condition changes. In this case, the forwarding plane network element sends the forwarding plane charging statistics to the charging system, and the charging system further sends the quota authorization information to the forwarding plane network element after completing the charging processing. The quota authorization information may be the quota authorization parameter.

In still another optional implementation, the forwarding plane network element receives a second control plane message sent by a control plane network element, where the second control plane message is sent by the control plane network element when the control plane charging information changes, and the forwarding plane network element sends the forwarding plane charging statistics to the charging system after receiving the second control plane message.

In specific implementation, the control plane network element may send the second control plane message to the forwarding plane network element when the control plane charging information changes, and the forwarding plane network element actively sends the forwarding plane charging statistics to the charging system after receiving the second control plane message.

Optionally, the second control plane message may further carry the control plane charging information before the change or control plane charging information after the change. If the second control plane message carries the control plane charging information before the change or the control plane charging information after the change, in addition to sending the forwarding plane charging statistics to the charging system, the forwarding plane network element further sends the control plane charging information to the charging system; or if the second control plane message does not include the control plane charging information, after receiving the forwarding plane charging statistics, the charging system may request the control plane network element to obtain the control plane charging information.

Further, if the charging system is an online charging system, the second control plane message may be further used to notify the forwarding plane network element that a control plane charging condition changes. In this case, the forwarding plane network element sends the forwarding plane charging statistics to the charging system, and the charging system further sends the quota authorization information to the forwarding plane network element after completing the charging processing. The quota authorization information may be the quota authorization parameter.

A second aspect of the present invention provides another charging method, including: receiving, by a charging system, forwarding plane charging statistics sent by a forwarding plane network element; and performing, by the charging system, charging processing based on the forwarding plane charging statistics and control plane charging information.

In the technical solution, an interface between the forwarding plane network element and the charging system is added, so that a report of the forwarding plane charging statistics is directly sent from the forwarding plane network element to the charging system, thereby reducing a charging delay.

In an optional implementation, the forwarding plane charging statistics are sent by the forwarding plane network element when the forwarding plane charging statistics meet a preset charging trigger condition.

If the charging system is an online charging system, the preset charging condition may include quota exhaustion, reaching quota valid duration, reaching quota idle duration, or the like. In addition, if the charging system is an online charging system, the forwarding plane charging statistics are used to apply to the online charging system for a new quota. In this case, the forwarding plane charging statistics may be obtained by using a credit control request message of the Diameter protocol.

In specific implementation, the forwarding plane network element sends the forwarding plane charging statistics to the charging system when the forwarding plane charging statistics meet the preset charging trigger condition. Optionally, the forwarding plane network element further sends a charging context identifier to the charging system. After receiving the forwarding plane charging statistics, the charging system actively sends control plane charging request information to a control plane network element when there is no control plane charging information corresponding to the charging context identifier in the charging system. The control plane network element sends the control plane charging information to the charging system after receiving the control plane charging request information. The charging system performs the charging processing based on the forwarding plane charging statistics and the control plane charging information.

Further, if the charging system is an online charging system, the charging system further sends quota authorization information to the forwarding plane network element after completing the charging processing. The quota authorization information may be an quota authorization parameter. The quota authorization information may be obtained by using the credit control request message of the Diameter protocol.

In another optional implementation, the charging system receives a first control plane message sent by a control plane network element, where the first control plane message is sent by the control plane network element when the control plane charging information changes. The charging system sends charging statistics collection request information to the forwarding plane network element, so that the forwarding plane network element sends the forwarding plane charging statistics based on the charging statistics collection request information.

In specific implementation, the control plane network element may send the first control plane message to the charging system when the control plane charging information changes. The charging system actively sends the charging statistics collection request information to the forwarding plane network element based on the first control plane message. The forwarding plane network element sends the forwarding plane charging statistics to the charging system after receiving the charging statistics collection request information.

Optionally, the first control plane message further includes the control plane charging information before the change or control plane charging information after the change. If the first control plane message does not include the control plane charging information, after receiving the forwarding plane charging statistics, the charging system may request the control plane network element to obtain the control plane charging information.

Further, if the charging system is an online charging system, the charging statistics collection request information may be further used to notify the forwarding plane network element that a control plane charging condition changes. In this case, the forwarding plane network element sends the forwarding plane charging statistics to the charging system, and the charging system further sends the quota authorization information to the forwarding plane network element after completing the charging processing. The quota authorization information may be the quota authorization parameter.

In still another optional implementation, the forwarding plane charging statistics are sent by the forwarding plane network element after receiving a second control plane message sent by a control plane network element.

In specific implementation, the control plane network element may send the second control plane message to the forwarding plane network element when the control plane charging information changes, and the forwarding plane network element actively sends the forwarding plane charging statistics to the charging system based on the second control plane message.

Optionally, the second control plane message may further include the control plane charging information before the change or control plane charging information after the change. If the second control plane message includes the control plane charging information before the change or the control plane charging information after the change, in addition to sending the forwarding plane charging statistics, the forwarding plane network element further sends the control plane charging information based on the second control plane message; or if the second control plane message does not include the control plane charging information, after receiving the forwarding plane charging statistics, the charging system may request the control plane network element to obtain the control plane charging information.

Further, if the charging system is an online charging system, the second control plane message may be further used to notify the forwarding plane network element that a control plane charging condition changes. In this case, the forwarding plane network element sends the forwarding plane charging statistics to the charging system, and the charging system further sends the quota authorization information to the forwarding plane network element after completing the charging processing. The quota authorization information may be the quota authorization parameter.

In still another optional implementation, the charging system receives control plane charging information sent by the control plane network element, and the forwarding plane charging statistics are sent by the forwarding plane network element after receiving the second control plane message sent by the control plane network element.

In specific implementation, when the control plane charging information changes, the control plane network element may simultaneously or separately send the second control plane message to the forwarding plane network element and send the control plane charging information to the charging system; the forwarding plane network element actively sends the forwarding plane charging statistics to the charging system based on the second control plane message; and the charging system performs the charging processing based on the forwarding plane charging statistics and the control plane charging information.

Optionally, the charging system further receives the charging context identifier sent by the control plane network element. That is, in addition to sending the control plane charging information to the charging system, the control plane network element further sends the charging context identifier to the charging system.

Optionally, the charging system further receives the control plane charging information sent by the forwarding plane network element. That is, in addition to sending the forwarding plane charging statistics, the forwarding plane network element further sends the control plane charging information based on the second control plane message, where the control plane charging information is carried in the second control plane message and sent to the forwarding plane network element.

Further, if the charging system is an online charging system, the second control plane message may be further used to notify the forwarding plane network element that a control plane charging condition changes. In this case, the forwarding plane network element sends the forwarding plane charging statistics to the charging system, and the charging system further sends the quota authorization information to the forwarding plane network element after completing the charging processing. The quota authorization information may be the quota authorization parameter.

A third aspect of the present invention provides a charging method, including: sending, by a control plane network element, control plane charging information to a charging system, so that the charging system performs charging processing based on the control plane charging information and forwarding plane charging statistics, where the forwarding plane charging statistics are sent by a forwarding plane network element to the charging system.

In the technical solution, an interface between the forwarding plane network element and the charging system is added, so that a report of the forwarding plane charging statistics is directly sent from the forwarding plane network element to the charging system, thereby reducing a charging delay.

In an optional implementation, when the control plane charging information changes, the control plane network element sends the control plane charging information to the charging system, and sends a second control plane message to the forwarding plane network element, so that the forwarding plane network element sends the forwarding plane charging statistics to the charging system based on the second control plane message.

In specific implementation, when the control plane charging information changes, the control plane network element may simultaneously or separately send the second control plane message to the forwarding plane network element and send the forwarding plane charging statistics to the charging system; the forwarding plane network element actively sends the forwarding plane charging statistics to the charging system based on the second control plane message; and the charging system performs the charging processing based on the forwarding plane charging statistics and the control plane charging information.

Optionally, the control plane network element further sends a charging context identifier to the charging system.

Further, if the charging system is an online charging system, the second control plane message may be further used to notify the forwarding plane network element that a control plane charging condition changes. In this case, the forwarding plane network element sends the forwarding plane charging statistics to the charging system, and the charging system further sends quota authorization information to the forwarding plane network element after completing the charging processing. The quota authorization information may be an quota authorization parameter.

In another optional implementation, the control plane network element sends a first control plane message to the charging system when the control plane charging information changes, so that the charging system requests the forwarding plane network element based on the first control plane message to obtain the forwarding plane charging statistics.

In specific implementation, the control plane network element may send the first control plane message to the charging system when the control plane charging information changes; the charging system sends charging statistics collection request information to the forwarding plane network element based on the first control plane message; and the forwarding plane network element sends the forwarding plane charging statistics to the charging system after receiving the charging statistics collection request information.

Optionally, the first control plane message further includes the control plane charging information before the change or control plane charging information after the change. If the first control plane message carries the control plane charging information before the change or the control plane charging information after the change, in addition to sending the forwarding plane charging statistics to the charging system, the forwarding plane network element further sends the control plane charging information to the charging system; or if the first control plane message does not include the control plane charging information, after receiving the forwarding plane charging statistics, the charging system may request the control plane network element to obtain the control plane charging information.

Further, if the charging system is an online charging system, the charging statistics collection request information may be further used to notify the forwarding plane network element that a control plane charging condition changes. In this case, the forwarding plane network element sends the forwarding plane charging statistics to the charging system, and the charging system further sends the quota authorization information to the forwarding plane network element after completing the charging processing. The quota authorization information may be the quota authorization parameter.

In still another optional implementation, the control plane network element sends the second control plane message to the forwarding plane network element when the control plane charging information changes, so that the forwarding plane network element sends the forwarding plane charging statistics to the charging system based on the second control plane message.

In specific implementation, the control plane network element may send the second control plane message to the forwarding plane network element when the control plane charging information changes, and the forwarding plane network element actively sends the forwarding plane charging statistics to the charging system based on the second control plane message.

Optionally, the second control plane message may further carry the control plane charging information before the change or control plane charging information after the change. If the second control plane message carries the control plane charging information before the change or the control plane charging information after the change, in addition to sending the forwarding plane charging statistics to the charging system, the forwarding plane network element further sends the control plane charging information to the charging system; or if the second control plane message does not include the control plane charging information, after receiving the forwarding plane charging statistics, the charging system may request the control plane network element to obtain the control plane charging information.

Further, if the charging system is an online charging system, the second control plane message may be further used to notify the forwarding plane network element that a control plane charging condition changes. In this case, the forwarding plane network element sends the forwarding plane charging statistics to the charging system, and the charging system further sends the quota authorization information to the forwarding plane network element after completing the charging processing. The quota authorization information may be the quota authorization parameter.

In still another optional implementation, the forwarding plane charging statistics are sent by the forwarding plane network element when the forwarding plane charging statistics meet a preset charging trigger condition.

In specific implementation, the forwarding plane network element sends the forwarding plane charging statistics to the charging system when the forwarding plane charging statistics meet the preset charging trigger condition. Optionally, the forwarding plane network element may further send a charging context identifier to the charging system. After receiving the forwarding plane charging statistics, the charging system actively requests the control plane charging information from the control plane network element when there is no control plane charging information corresponding to the charging context identifier in the charging system. The control plane network element sends the control plane charging information to the charging system after receiving the request. The charging system performs the charging processing based on the forwarding plane charging statistics and the control plane charging information.

Further, if the charging system is an online charging system, the forwarding plane charging statistics are used to apply to the online charging system for a new quota. In this case, the forwarding plane charging statistics may be obtained by using a credit control request message of the Diameter protocol.

A fourth aspect of the present invention further provides a forwarding plane network element, including a transmitter, a receiver, a memory, and a processor, where the memory stores a set of programs, and the processor is configured to invoke the programs stored in the memory, so that the forwarding plane network element performs some or all methods of the first aspect.

A fifth aspect of the present invention further provides another forwarding plane network element, including a sending module, a receiving module, and a processing module, where the forwarding plane network element performs some or all methods of the first aspect by using the sending module, the receiving module, and the processing module.

A sixth aspect of the present invention provides a computer storage medium, where the computer storage medium stores a program, and when executed, the program includes some or all steps of the first aspect.

A seventh aspect of the present invention further provides a charging system, including a transmitter, a receiver, a memory, and a processor, where the memory stores a set of programs, and the processor is configured to invoke the programs stored in the memory, so that the charging system performs some or all methods of the second aspect.

An eighth aspect of the present invention further provides another charging system, including a sending module, a receiving module, and a processing module, where the charging system performs some or all methods of the second aspect by using the sending module, the receiving module, and the processing module.

A ninth aspect of the present invention provides a computer storage medium, where the computer storage medium stores a program, and when executed, the program includes some or all steps of the second aspect.

A tenth aspect of the present invention further provides a control plane network element, including a transmitter, a receiver, a memory, and a processor, where the memory stores a set of programs, and the processor is configured to invoke the programs stored in the memory, so that the control plane network element performs some or all methods of the third aspect.

An eleventh aspect of the present invention further provides another control plane network element, including a sending module, a receiving module, and a processing module, where the control plane network element performs some or all methods of the third aspect by using the sending module, the receiving module, and the processing module.

A twelfth aspect of the present invention provides a computer storage medium, where the computer storage medium stores a program, and when executed, the program includes some or all steps of the third aspect.

BRIEF DESCRIPTION OF DRAWINGS

To describe embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

This section first describes some basic concepts used in the embodiments of the present invention.

A control plane network element is a network element that is responsible for mobility management, session management, forwarding path management, or charging measurement management in a mobile network, for example, a mobility management entity (MME), a GW-C, a PCRF, or all or a part of a mobile gateway controller formed by combining the network element and an SDN controller.

A forwarding plane network element is a network element that performs a data forwarding action, and may be a physical or virtual forwarding device such as a packet data network gateway (P-GW), a serving gateway (S-GW), a forwarding plane of the P-GW/S-GW, a router, a switch, or an SDN switch.

A charging system is responsible for obtaining and consolidating charging information, CDR generation, and charging credit control, and providing a charging function.

The charging system may be classified into an OFCS and an OCS depending on whether charging is performed in real time.

In the present invention, an interface between the forwarding plane network element and the charging system may be added, so that a report of forwarding plane charging statistics is directly sent from the forwarding plane network element to the charging system, thereby reducing a charging delay. The following separately uses the embodiments shown in FIG. 1 to FIG. 4 for description.

Figure 1:
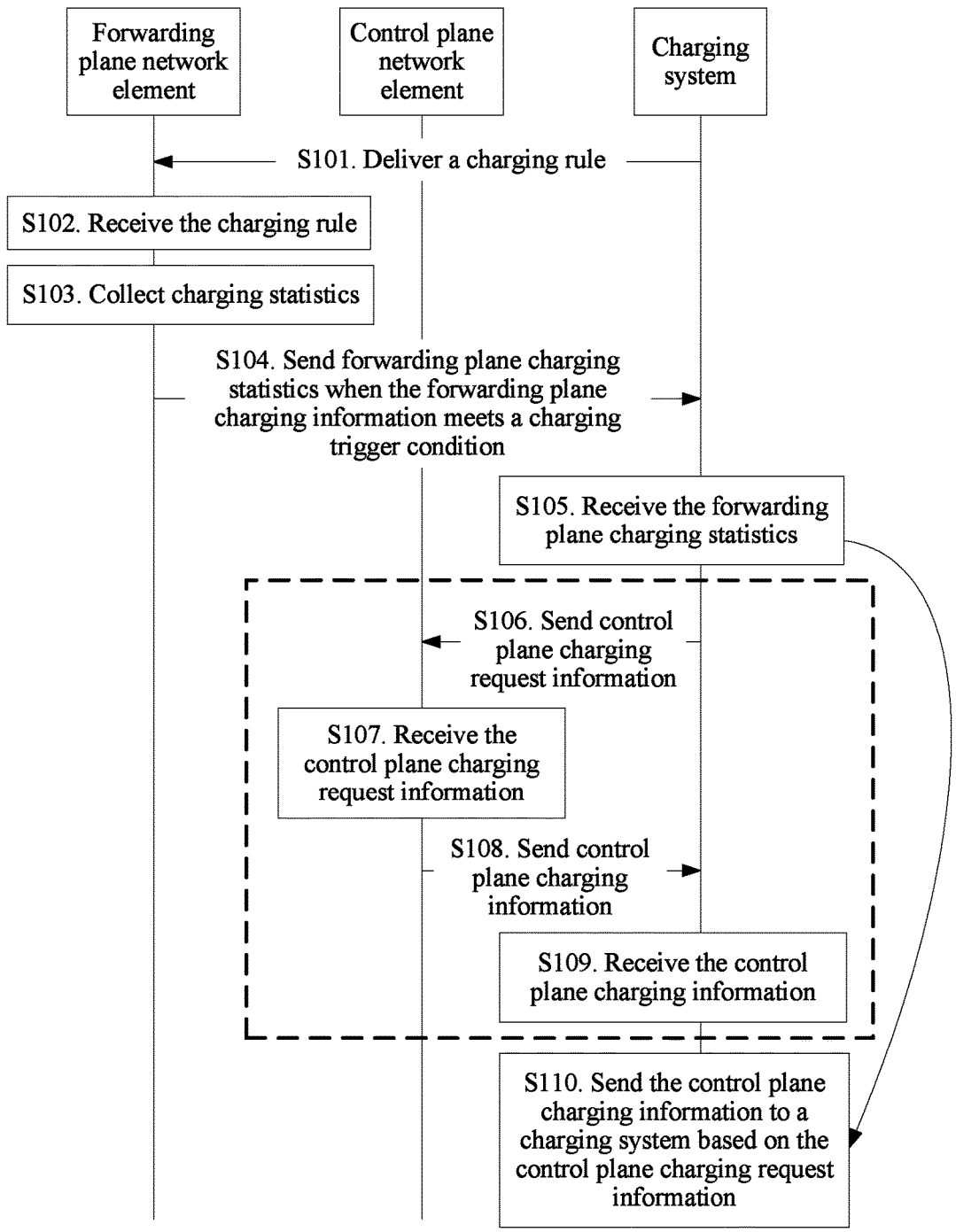
FIG. 1 is a schematic flowchart of a charging method according to a first embodiment of the present invention.

Referring to FIG. 1, FIG. 1 is a schematic flowchart of a charging method according to a first embodiment of the present invention. A scenario described in this embodiment of the present invention is as follows: In a case of offline charging, a forwarding plane network element triggers reporting of forwarding plane charging statistics. The charging method shown in FIG. 1 may include the following steps.

S101. Optionally, a charging system delivers a charging rule to the forwarding plane network element.

It should be noted that the charging system may deliver the charging rule to the forwarding plane network element periodically or under a specific condition, for example, the charging rule changes, or charging processing needs to be performed on a user.

It should be further noted that, alternatively, the charging rule may be delivered by a control plane network element to the forwarding plane network element.

S102. The forwarding plane network element receives the charging rule.

S103. The forwarding plane network element collects charging statistics based on the charging rule.

S104. The forwarding plane network element sends the forwarding plane charging statistics to the charging system when the forwarding plane charging statistics meet a preset charging trigger condition.

It should be noted that, in a case of online charging, the forwarding plane charging statistics are used to apply to the charging system for a new quota.

Optionally, the forwarding plane network element may further send a charging context identifier to the charging system when the forwarding plane charging statistics meet the preset charging trigger condition.

S105. The charging system receives the forwarding plane charging statistics.

If the forwarding plane network element sends the charging context identifier, the charging system further receives the charging context identifier.

S106. Optionally, the charging system sends control plane charging request information to a control plane network element.

When there is no control plane charging information corresponding to the charging context identifier in the charging system, step S106 is performed; or when there is control plane charging information corresponding to the charging context identifier in the charging system, step S110 is directly performed.

Optionally, in addition to sending the control plane request information to the control plane network element, the charging system may further send the charging context identifier to the control plane network element.

S107. The control plane network element receives the control plane charging request information.

If the charging system sends the charging context identifier, the control plane network element further receives the charging context identifier.

S108. The control plane network element sends the control plane charging information to the charging system based on the control plane charging request information.

Optionally, the control plane network element may further send the charging context identifier to the charging system based on the control plane charging request information.

S109. The charging system receives the control plane charging information.

If the control plane network element sends the charging context identifier, the charging system further receives the charging context identifier.

S110. The charging system performs charging processing based on the forwarding plane charging statistics and the control plane charging information.

Optionally, the charging system may associate the forwarding plane charging statistics with the control plane charging information based on the charging context identifier, and then perform the charging processing.

Further, in a case of online charging, the charging system further sends quota authorization information to the forwarding plane network element after completing the charging processing. The quota authorization information may be an quota authorization parameter.

In the embodiment shown in FIG. 1, an interface between the forwarding plane network element and the charging system is added, so that the forwarding plane network element can directly report the forwarding plane charging statistics to the charging system, thereby reducing a charging delay.

Figure 2A:
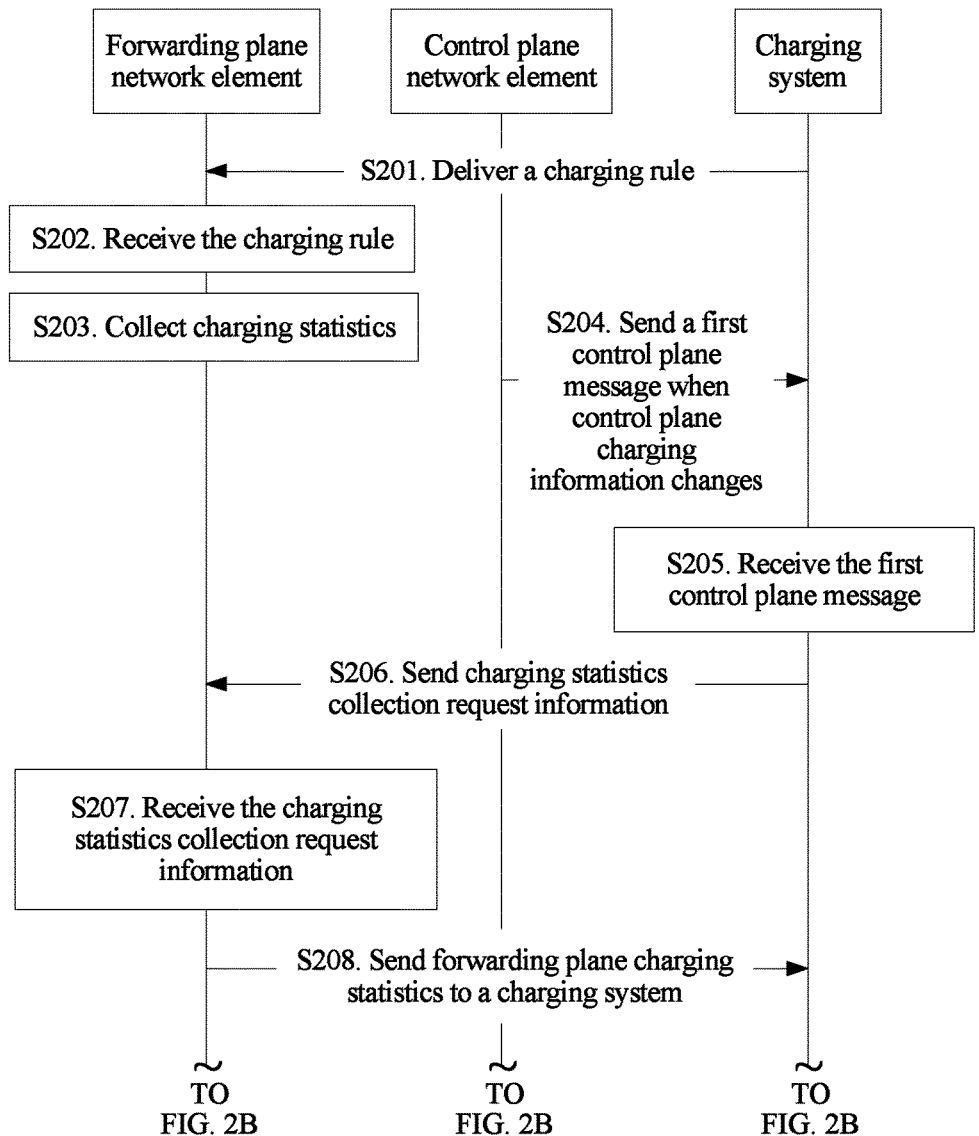
FIG. 2A and FIG. 2B are a schematic flowchart of a charging method according to a second embodiment of the present invention.
Figure 2B:
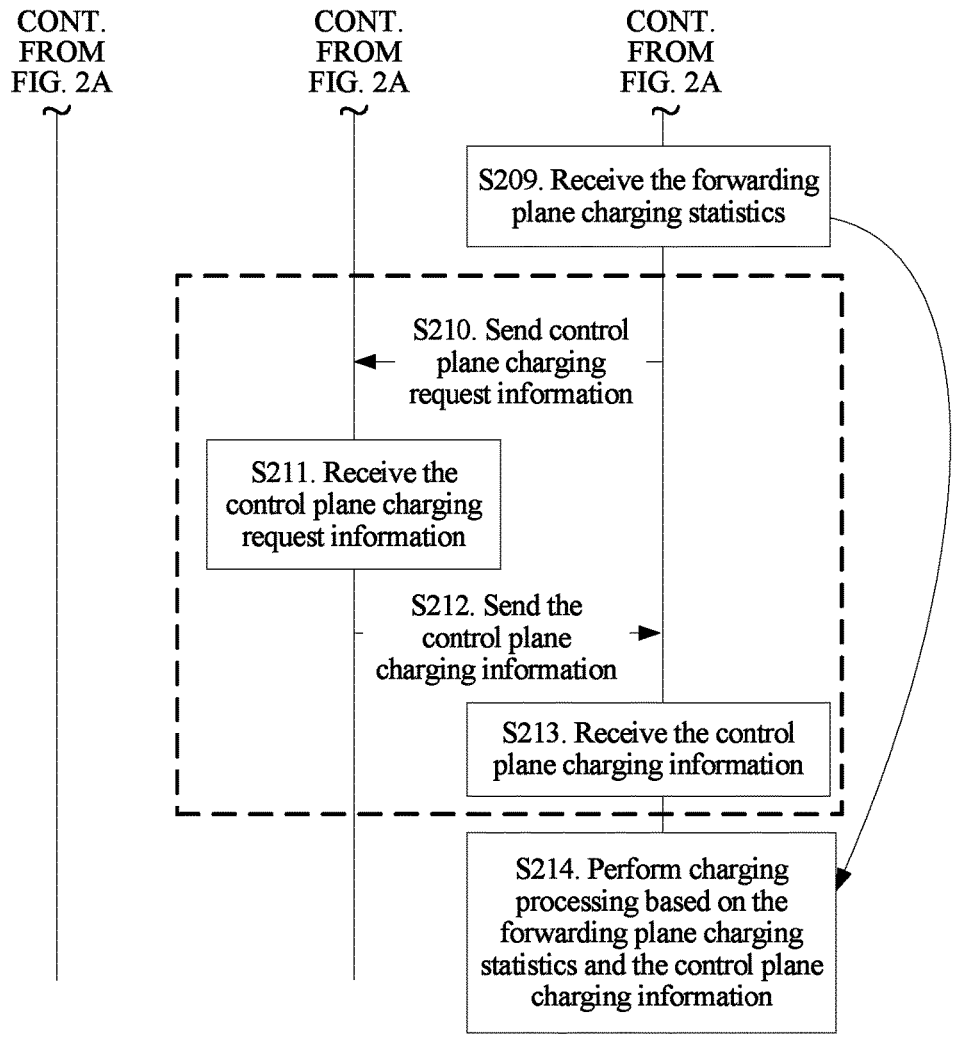

Referring to FIG. 2A and FIG. 2B, FIG. 2A and FIG. 2B are a schematic flowchart of a charging method according to a second embodiment of the present invention. A scenario described in this embodiment of the present invention is as follows: In a case of offline charging, a control plane network element triggers reporting of forwarding plane charging statistics. The charging method shown in FIG. 2A and FIG. 2B may include the following steps.

S201. Optionally, a charging system delivers a charging rule to a forwarding plane network element.

It should be noted that, alternatively, the charging rule may be delivered by the control plane network element to the forwarding plane network element.

S202. The forwarding plane network element receives the charging rule.

S203. The forwarding plane network element collects charging statistics based on the charging rule.

S204. The control plane network element sends a first control plane message to the charging system when control plane charging information changes.

Optionally, the first control plane message may further include the control plane charging information before the change and/or control plane charging information after the change.

Optionally, the control plane network element may further send a charging context identifier to the charging system when the control plane charging information changes. The charging context identifier may be carried in the first control plane message.

S205. The charging system receives the first control plane message.

If the control plane network element sends the charging context identifier, the charging system further receives the charging context identifier.

S206. The charging system sends charging statistics collection request information to the forwarding plane network element based on the first control plane message.

It should be noted that, in a case of online charging, the charging system may further notify, based on the first control plane message, the forwarding plane network element that the forwarding plane charging changes. The forwarding plane charging statistics are used to apply to the charging system for a new quota.

Optionally, the charging system may further send the charging context identifier to the forwarding plane network element based on the first control plane message.

S207. The forwarding plane network element receives the charging statistics collection request information.

If the charging system sends the charging context identifier, the forwarding plane network element further receives the charging context identifier.

S208. The forwarding plane network element sends the forwarding plane charging statistics to the charging system based on the charging statistics collection request information.

Optionally, the forwarding plane network element may further send the charging context identifier of the forwarding plane network element to the charging system based on the charging statistics collection request information.

S209. The charging system receives the forwarding plane charging statistics.

If the forwarding plane network element sends the charging context identifier, the charging system further receives the charging context identifier.

S210. Optionally, the charging system sends control plane charging request information to the control plane network element based on the forwarding plane charging statistics.

It should be noted that, if the first control plane message sent by the control plane network element to the charging system carries the control plane charging information in S204, the charging system may directly perform S214 after receiving the forwarding plane charging statistics.

Optionally, the charging system may further send the charging context identifier to the control plane network element based on the forwarding plane charging statistics.

S211. The control plane network element receives the control plane charging request information.

If the charging system sends the charging context identifier, the control plane network element further receives the charging context identifier.

S212. The control plane network element sends the control plane charging information to the charging system based on the control plane charging request information.

Optionally, the control plane network element may further send the charging context identifier to the charging system based on the control plane charging request information.

S213. The charging system receives the control plane charging information.

If the control plane network element sends the charging context identifier, the charging system further receives the charging context identifier.

S214. The charging system performs charging processing based on the forwarding plane charging statistics and the control plane charging information.

Optionally, the charging system may further associate the forwarding plane charging statistics with the control plane charging information based on the charging context identifier, and then perform the charging processing.

Further, in a case of online charging, the charging system further sends quota authorization information to the forwarding plane network element after completing the charging processing. The quota authorization information may be an quota authorization parameter.

In the embodiment shown in FIG. 2A and FIG. 2B, an interface between the forwarding plane network element and the charging system is added, so that the forwarding plane network element can directly report the forwarding plane charging statistics to the charging system, thereby reducing a charging delay.

Figure 3A:
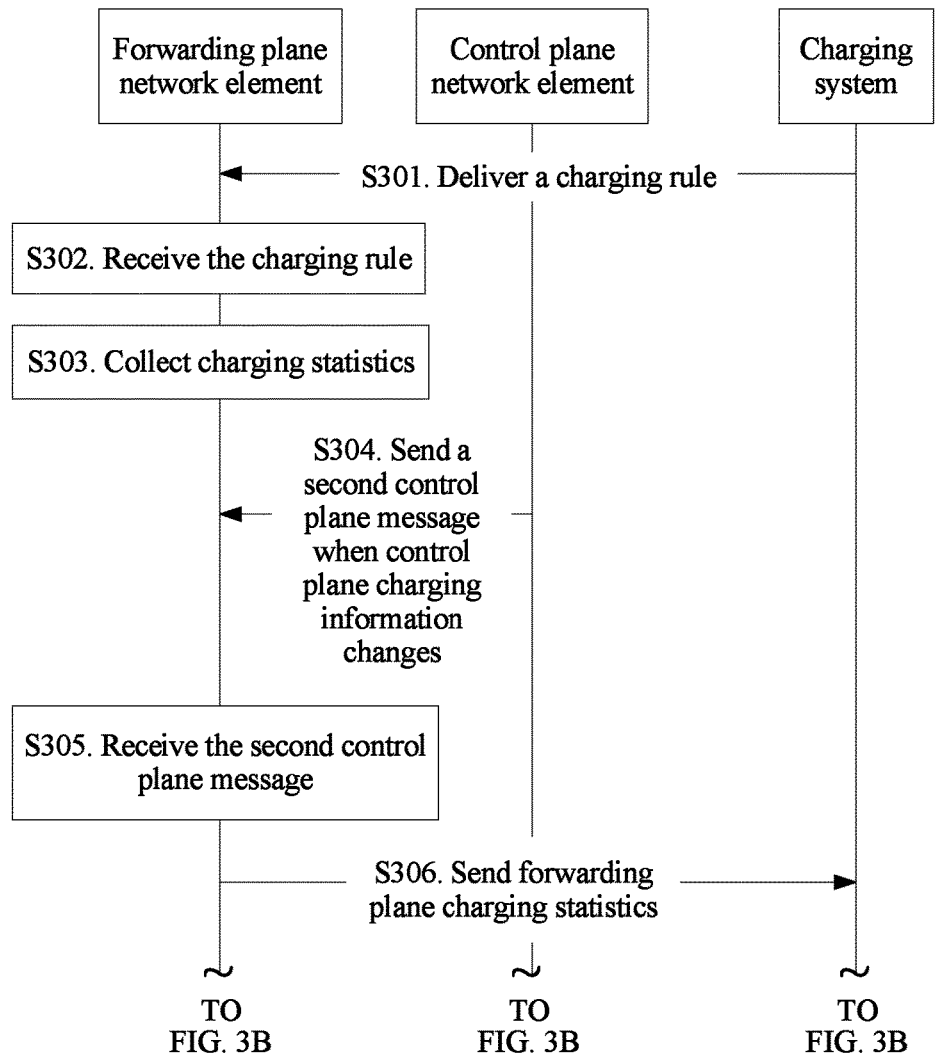
FIG. 3A and FIG. 3B are a schematic flowchart of a charging method according to a third embodiment of the present invention.
Figure 3B:
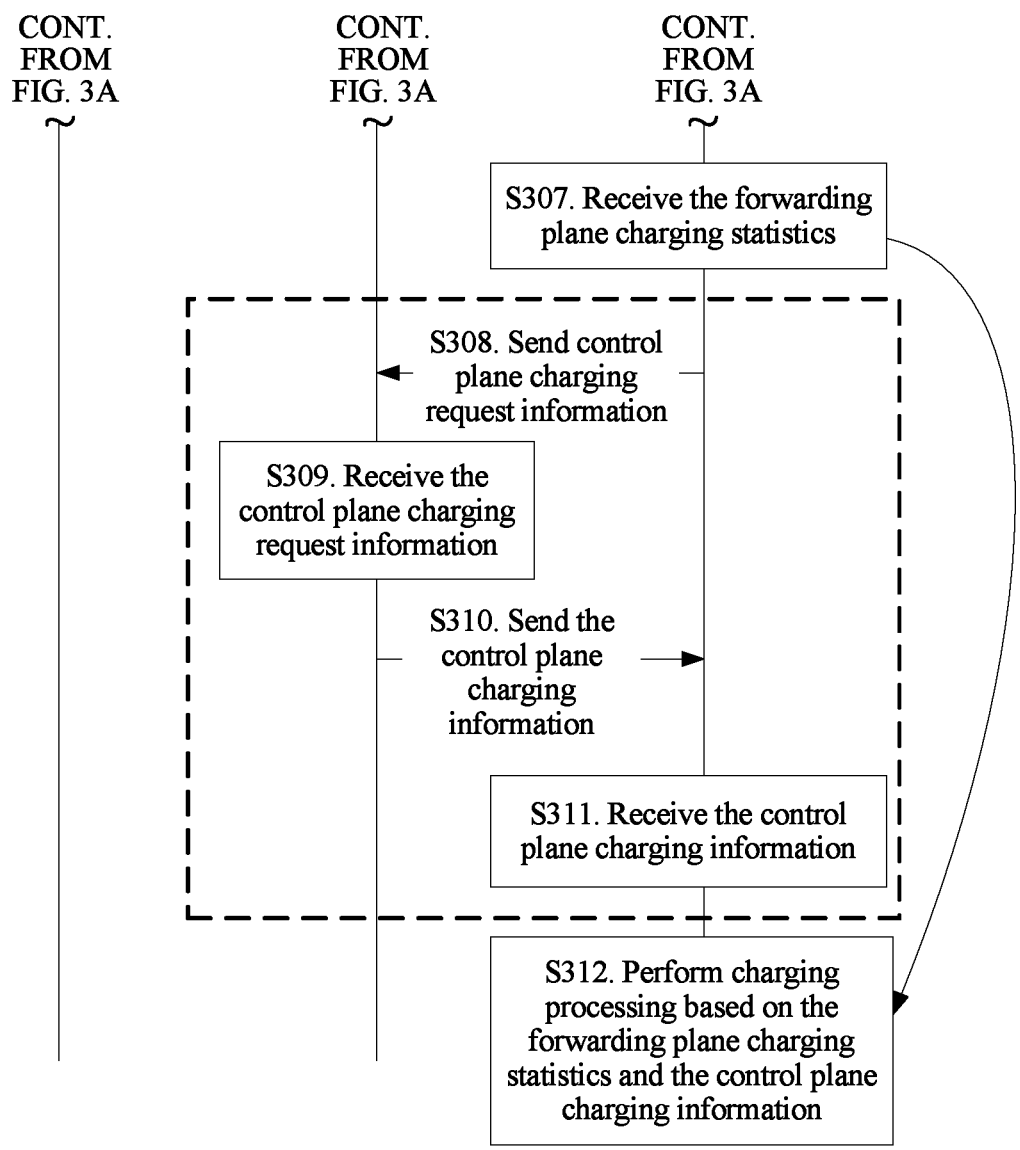

Referring to FIG. 3A and FIG. 3B, FIG. 3A and FIG. 3B are a schematic flowchart of a charging method according to a third embodiment of the present invention. A scenario described in this embodiment of the present invention is as follows: In a case of offline charging, a control plane network element triggers reporting of forwarding plane charging statistics. The charging method shown in FIG. 3A and FIG. 3B may include the following steps.

S301. Optionally, a charging system delivers a charging rule to a forwarding plane network element.

It should be noted that, alternatively, the charging rule may be delivered by the control plane network element to the forwarding plane network element.

S302. The forwarding plane network element receives the charging rule.

S303. The forwarding plane network element collects charging statistics based on the charging rule.

S304. The control plane network element sends a second control plane message to the forwarding plane network element when control plane charging information changes.

Optionally, the control plane network element may further send a charging context identifier to the forwarding plane network element when the control plane charging information changes. The charging context identifier may be carried in the second control plane message.

S305. The forwarding plane network element receives the second control plane message.

If the control plane network element sends the charging context identifier, the forwarding plane network element further receives the charging context identifier.

S306. The forwarding plane network element sends the forwarding plane charging statistics to the charging system based on the second control plane message.

It should be noted that, in a case of online charging, the forwarding plane charging statistics sent by the forwarding plane network element are used to apply to the charging system for a new quota.

Optionally, the second control plane message may carry the control plane charging information before the change and/or control plane charging information after the change. If the second control plane message carries the control plane charging information before the change and/or the control plane charging information after the change, the forwarding plane network element further sends the control plane charging information to the charging system.

Optionally, the forwarding plane network element may further send the charging context identifier of the forwarding plane network element to the charging system based on the second control plane message.

S307. The charging system receives the forwarding plane charging statistics.

If the forwarding plane network element sends the charging context identifier, the charging system further receives the charging context identifier.

S308. Optionally, the charging system sends control plane charging request information to the control plane network element based on the forwarding plane charging statistics.

It should be noted that, if the second control plane message sent by the control plane network element to the forwarding plane network element carries the control plane charging information in S304, the forwarding plane network element sends the forwarding plane charging statistics and the control plane charging information to the charging system in S306, and the charging system may directly perform step S312 after receiving the forwarding plane charging statistics.

Optionally, the charging system may further send the charging context identifier to the control plane network element based on the forwarding plane charging statistics.

S309. The control plane network element receives the control plane charging request information.

If the charging system sends the charging context identifier, the control plane network element further receives the charging context identifier.

S310. The control plane network element sends the control plane charging information to the charging system based on the control plane charging request information.

Optionally, the control plane network element may further send the charging context identifier to the charging system based on the control plane charging request information.

S311. The charging system receives the control plane charging information.

If the control plane network element sends the charging context identifier, the charging system further receives the charging context identifier.

S312. The charging system performs charging processing based on the forwarding plane charging statistics and the control plane charging information.

Optionally, the charging system may further associate the forwarding plane charging statistics with the control plane charging information based on the charging context identifier, and then perform the charging processing.

Further, in a case of online charging, the charging system further sends quota authorization information to the forwarding plane network element after completing the charging processing. The quota authorization information may be an quota authorization parameter.

In the embodiment shown in FIG. 3A and FIG. 3B, an interface between the forwarding plane network element and the charging system is added, so that the forwarding plane network element can directly report the forwarding plane charging statistics to the charging system, thereby reducing a charging delay.

Figure 4:
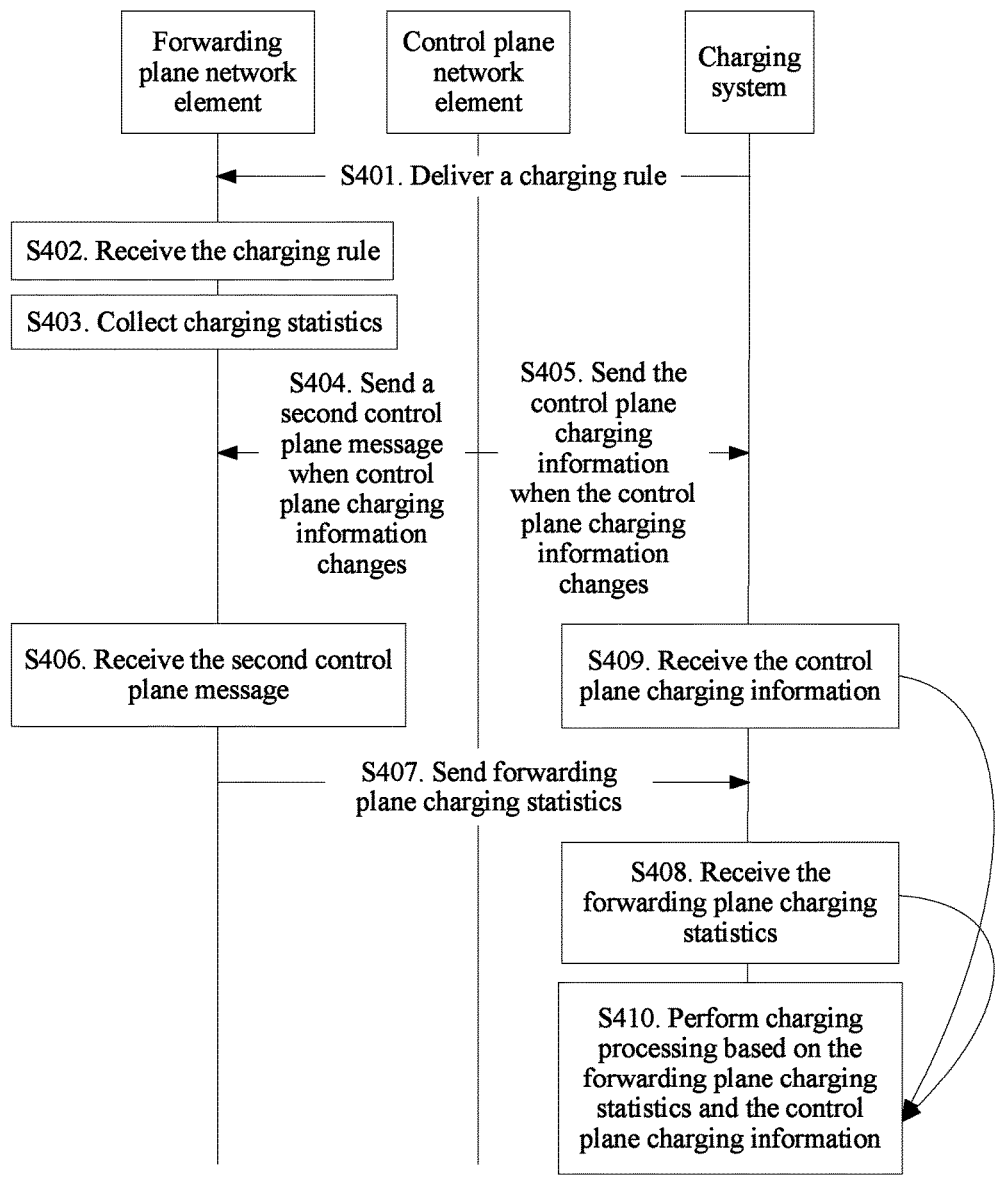
FIG. 4 is a schematic flowchart of a charging method according to a fourth embodiment of the present invention.

Referring to FIG. 4, FIG. 4 is a schematic flowchart of a charging method according to a fourth embodiment of the present invention. A scenario described in this embodiment of the present invention is as follows: In a case of offline charging, a control plane network element triggers reporting of forwarding plane charging statistics. The charging method shown in FIG. 4 may include the following steps.

S401. Optionally, a charging system delivers a charging rule to a forwarding plane network element.

It should be noted that, alternatively, the charging rule may be delivered by the control plane network element to the forwarding plane network element.

S402. The forwarding plane network element receives the charging rule.

S403. The forwarding plane network element collects charging statistics based on the charging rule.

S404. The control plane network element sends a second control plane message to the forwarding plane network element when control plane charging information changes.

Optionally, the control plane network element may further send a charging context identifier to the forwarding plane network element when the control plane charging information changes. The charging context identifier may be carried in the second control plane message.

S405. The control plane network element sends the control plane charging information to the charging system when the control plane charging information changes.

It should be noted that there is no strict performing sequence between S404 and S405, or S404 and S405 may be simultaneously performed. This is not limited in the present invention.

It should be further noted that the control plane network element may further send the charging context identifier to the charging system when the control plane charging information changes.

S406. The forwarding plane network element receives the second control plane message.

If the control plane network element sends the charging context identifier, the forwarding plane network element further receives the charging context identifier.

S407. The forwarding plane network element sends the forwarding plane charging statistics to the charging system based on the second control plane message.

Optionally, the second control plane message may carry the control plane charging information before the change and/or control plane charging information after the change. If the second control plane message carries the control plane charging information before the change and/or the control plane charging information after the change, in addition to sending the forwarding plane charging statistics to the charging system, the forwarding plane network element further needs to send the control plane charging information.

In a case of online charging, the forwarding plane charging statistics sent to the charging system by the forwarding plane network element after receiving the second control plane message are used to apply to the charging system for a new quota.

Optionally, the forwarding plane network element may further send the charging context identifier to the charging system based on the second control plane message.

S408. The charging system receives the forwarding plane charging statistics.

If the forwarding plane network element sends the charging context identifier, the charging system further receives the charging context identifier.

S409. The charging system receives the control plane charging information.

If the control plane network element sends the charging context identifier, the charging system further receives the charging context identifier.

S410. The charging system performs charging processing based on the forwarding plane charging statistics and the control plane charging information.

Optionally, the charging system may further associate the forwarding plane charging statistics with the control plane charging information based on the charging context identifier, and then perform the charging processing.

Further, in a case of online charging, the charging system further sends quota authorization information to the forwarding plane network element after completing the charging processing. The quota authorization information may be an quota authorization parameter.

In the embodiment shown in FIG. 4, an interface between the forwarding plane network element and the charging system is added, so that the forwarding plane network element can directly report the forwarding plane charging statistics to the charging system, thereby reducing a charging delay.

Figure 5:
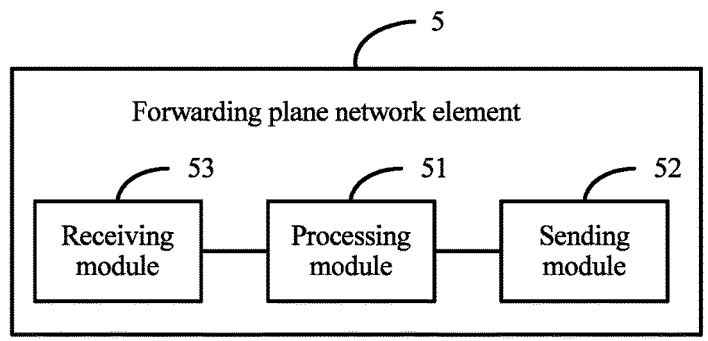
FIG. 5 is a schematic structural diagram of a forwarding plane network element according to a fifth embodiment of the present invention.

Referring to FIG. 5, FIG. 5 is a schematic structural diagram of a forwarding plane network element according to a fifth embodiment of the present invention. As shown in FIG. 5, the forwarding plane network element 5 may include at least a processing module 51 and a sending module 52.

The processing module 51 is configured to collect charging statistics.

The sending module 52 is configured to send forwarding plane charging statistics to a charging system, so that the charging system performs charging processing based on the forwarding plane charging statistics and control plane charging information.

In an optional implementation, the forwarding plane charging statistics are sent by the forwarding plane network element when the forwarding plane charging statistics meet a preset charging trigger condition.

In another optional implementation, the forwarding plane network element 5 may further include a receiving module 53, configured to receive charging statistics collection request information sent by the charging system. The sending module 52 sends the forwarding plane charging statistics to the charging system after the receiving module 53 receives the charging statistics collection request information sent by the charging system. The charging statistics collection request information is sent by the charging system after receiving a first control plane message sent by a control plane network element.

Optionally, the first control plane message further includes the control plane charging information before the change and/or control plane charging information after the change.

In still another optional implementation, the forwarding plane network element 5 may further include a receiving module 53, configured to receive a second control plane message sent by a control plane network element, where the second control plane message is sent by the control plane network element when the control plane charging information changes, and the forwarding plane network element sends the forwarding plane charging statistics to the charging system after receiving the second control plane message.

Optionally, the second control plane message may carry the control plane charging information before the change and/or control plane charging information after the change. If the second control plane message carries the control plane charging information before the change and/or the control plane charging information after the change, the sending module 52 is further configured to send the control plane charging information to the charging system.

Optionally, the control plane charging information is obtained by the charging system by sending a request to the control plane network element after receiving the forwarding plane charging statistics.

Further, the receiving module 53 is further configured to receive a charging rule sent by the charging system, where the processing module 51 may collect charging statistics based on the charging rule.

The charging processing includes offline charging CDR generation, or online charging quota authorization.

The forwarding plane network element may further send a charging context identifier to the charging system, so that the charging system associates the forwarding plane charging statistics with the control plane charging information based on the charging context identifier of the forwarding plane network element and the charging context identifier of the control plane network element, where the charging context identifier includes at least one of a service flow identifier, IP information of a service flow, or a charging group or a rate identifier associated with one or more to-be-charged service flows.

The charging context identifier sent by the control plane network element may be carried in the first or second control plane message.

It should be noted that a function of each function module of the forwarding plane network element 5 in this embodiment may be implemented according to the methods in the foregoing method embodiments, and may be corresponding to related descriptions in the method embodiments in FIG. 1 to FIG. 4. Details are not described herein again.

Figure 6:
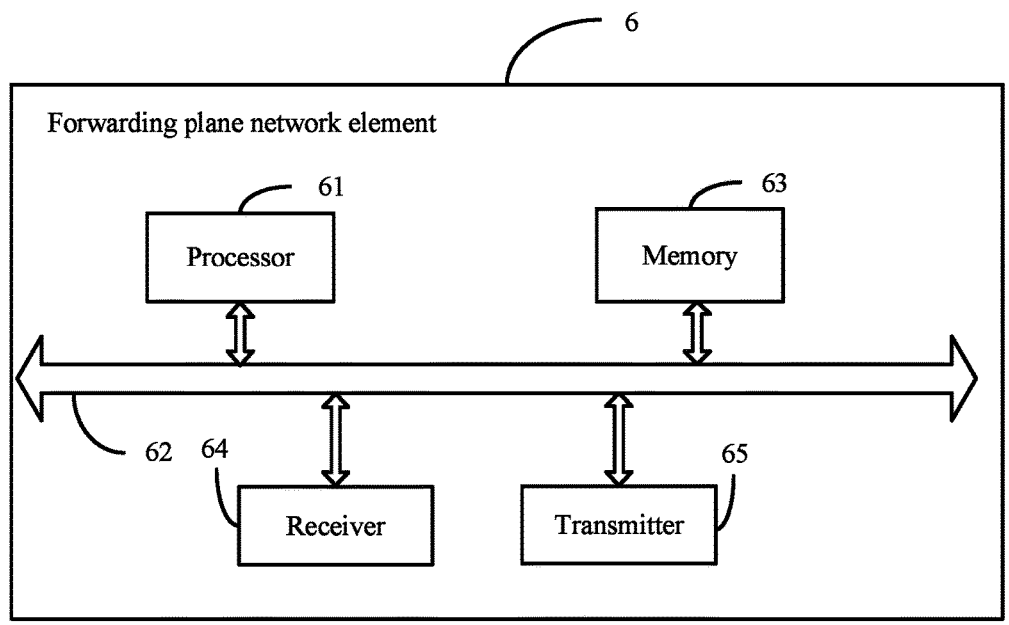
FIG. 6 is a schematic structural diagram of another forwarding plane network element according to a sixth embodiment of the present invention.

Referring to FIG. 6, FIG. 6 is a schematic structural diagram of another forwarding plane network element according to a sixth embodiment of the present invention. As shown in FIG. 6, the forwarding plane network element 6 may include: at least one processor 61, at least one communications bus 62, a memory 63, a receiver 64, and a transmitter 65. The communications bus 62 is configured to implement connection and communication between these components. The memory 63 may be a high-speed RAM memory or a non-volatile memory, such as at least one magnetic disk memory. Optionally, the memory 63 may alternatively be at least one storage apparatus far away from the processor 61.

It can be understood that in this implementation, a function implemented by the forwarding plane network element 6 may be implemented according to the methods in the method embodiments shown in FIG. 1 to FIG. 4, and may be corresponding to related descriptions in FIG. 2A and FIG. 2B to FIG. 6. Details are not described herein again.

Figure 7:
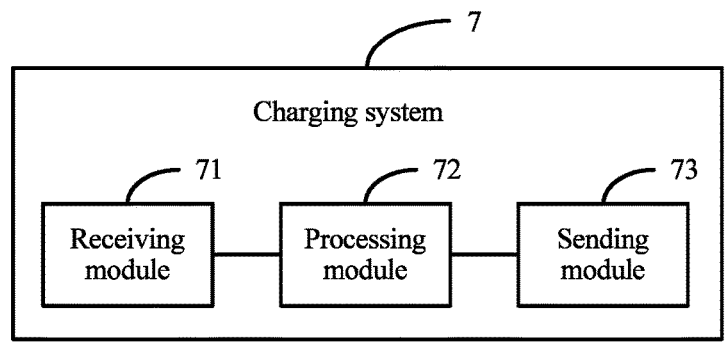
FIG. 7 is a schematic structural diagram of a charging system according to a seventh embodiment of the present invention.

Referring to FIG. 7, FIG. 7 is a schematic structural diagram of a charging system according to a seventh embodiment of the present invention. As shown in FIG. 7, the charging system 7 may include at least a receiving module 71 and a processing module 72.

The receiving module 71 is configured to receive forwarding plane charging statistics sent by a forwarding plane network element.

The processing module 72 is configured to perform charging processing based on the forwarding plane charging statistics and control plane charging information.

In an optional implementation, the forwarding plane charging statistics are sent by the forwarding plane network element when the forwarding plane charging statistics meet a preset charging trigger condition.

The charging system 7 further includes a sending module 73, configured to send control plane charging request information to a control plane network element if the charging system has no control plane charging information corresponding to the charging context identifier. The receiving module 71 is further configured to receive the control plane charging information sent by the control plane network element.

In another optional implementation, the charging system 7 may further include a sending module 73. The receiving module 71 may further receive a first control plane message sent by the control plane network element, where the first control plane message is sent by the control plane network element when the control plane charging information changes. The sending module 73 sends charging statistics collection request information to the forwarding plane network element, so that the forwarding plane network element sends the forwarding plane charging statistics based on the charging statistics collection request information.

Optionally, the first control plane message carries the control plane charging information before the change and/or control plane charging information after the change. If the first control plane message carries the control plane charging information before the change and/or the control plane charging information after the change, the receiving module 71 is further configured to receive the control plane charging information sent by the forwarding plane network element; or if the first control plane message does not carry the control plane charging information before the change and/or the control plane charging information after the change, the sending module 73 is further configured to send the control plane charging request information to the control plane network element, and the receiving module 71 is further configured to receive the control plane charging information sent by the control plane network element.

In still another optional implementation, the forwarding plane charging statistics are sent by the forwarding plane network element after receiving a second control plane message sent by a control plane network element.

Optionally, the second control plane message may carry the control plane charging information before the change and/or control plane charging information after the change. If the second control plane message carries the control plane charging information before the change and/or the control plane charging information after the change, the receiving module 71 is further configured to receive the control plane charging information sent by the forwarding plane network element; or if the second control plane message does not carry the control plane charging information before the change and/or the control plane charging information after the change, the sending module 73 is further configured to send the control plane charging request information to the control plane network element, and the receiving module 71 is further configured to receive the control plane charging information sent by the control plane network element.

Further, the receiving module 71 is further configured to receive the control plane charging information sent by the control plane network element, where the control plane charging information is sent by the control plane network element when the control plane charging information changes.

Still further, the sending module 73 is further configured to send a charging rule to the forwarding plane network element.

The charging processing includes offline charging CDR generation, or online charging quota authorization.

The receiving module 71 may further receive the charging context identifier sent by the forwarding plane network element and the control plane network element. The processing module 71 is further configured to associate the forwarding plane charging statistics with the control plane charging information based on the charging context identifier of the forwarding plane network element and the control plane network element.

The charging context identifier sent by the control plane network element may be carried in the first or second control plane message.

The charging context identifier includes at least one of a service flow identifier, IP information of a service flow, or a charging group or a rate identifier associated with one or more to-be-charged service flows.

It should be noted that a function of each function module of the charging system 7 in this embodiment may be implemented according to the methods in the foregoing method embodiments, and may be corresponding to related descriptions in the method embodiments in FIG. 1 to FIG. 4. Details are not described herein again.

Figure 8:
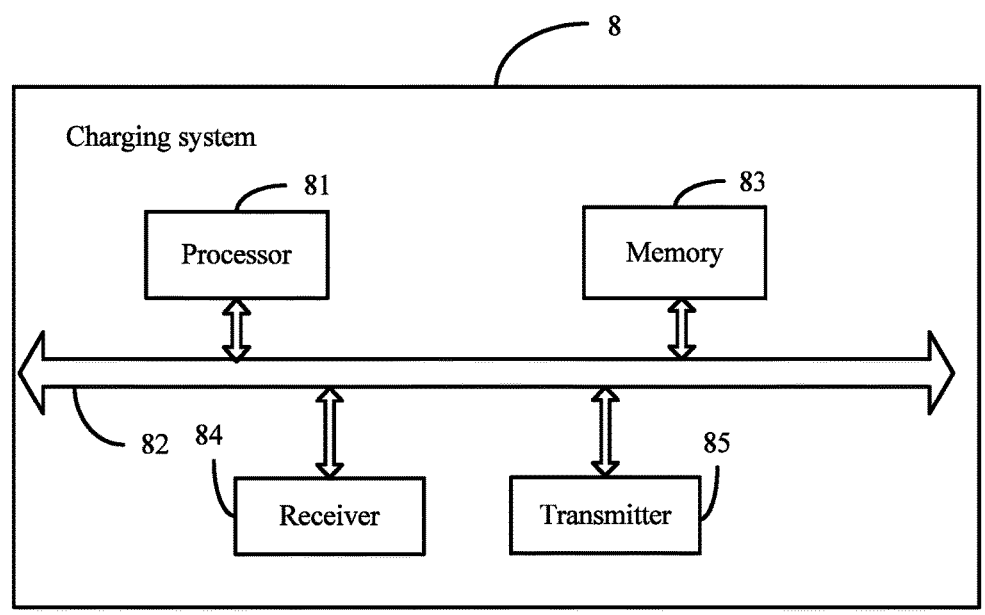
FIG. 8 is a schematic structural diagram of another charging system according to an eighth embodiment of the present invention.

Referring to FIG. 8, FIG. 8 is a schematic structural diagram of another charging system according to an eighth embodiment of the present invention. As shown in FIG. 8, the charging system 8 may include: at least one processor 81, at least one communications bus 82, a memory 83, a receiver 84, and a transmitter 85. The communications bus 82 is configured to implement connection and communication between these components. The memory 83 may be a high-speed RAM memory or a non-volatile memory, such as at least one magnetic disk memory. Optionally, the memory 83 may alternatively be at least one storage apparatus far away from the processor 81.

It can be understood that in this implementation, a function implemented by the charging system 8 may be implemented according to the methods in the method embodiments shown in FIG. 1 to FIG. 4, and may be corresponding to related descriptions in FIG. 1 to FIG. 4. Details are not described herein again.

Figure 9:
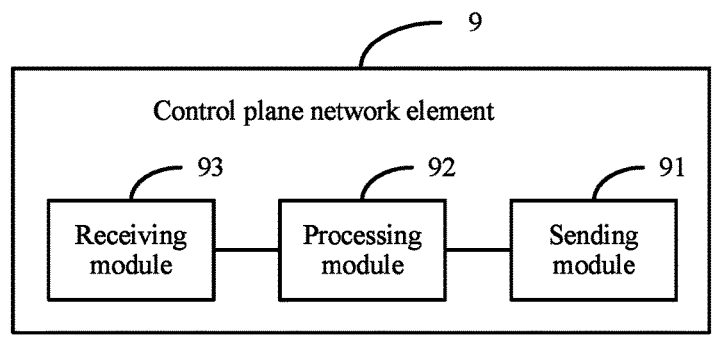
FIG. 9 is a schematic structural diagram of a control plane network element according to a ninth embodiment of the present invention.

Referring to FIG. 9, FIG. 9 is a schematic structural diagram of a control plane network element according to a ninth embodiment of the present invention. As shown in FIG. 9, the control plane network element 9 may include at least a sending module 91.

The sending module 91 is configured to send control plane charging information to a charging system, so that the charging system performs charging processing based on the control plane charging information and forwarding plane charging statistics.

The forwarding plane charging statistics are sent by a forwarding plane network element to the charging system.

In an optional implementation, the control plane network element 9 may further include a processing module 92. The processing module 92 is configured to determine whether the control plane charging information changes. The sending module 91 is configured to: when the control plane charging information changes, send the control plane charging information to the charging system, and send a second control plane message to the forwarding plane network element, so that the forwarding plane network element sends the forwarding plane charging statistics to the charging system based on the second control plane message.

In another optional implementation, the control plane network element 9 may further include a processing module 92. The processing module 92 is configured to determine whether the control plane charging information changes. The sending module 91 is configured to send a first control plane message to the charging system when the control plane charging information changes, so that the charging system requests the forwarding plane network element to obtain the forwarding plane charging statistics based on the first control plane message.

Optionally, the control plane network element 9 may further include a receiving module 93, configured to receive the control plane charging request information sent by the charging system. The sending module 91 sends the control plane charging information to the charging system after the receiving module 93 receives the control plane charging request information sent by the charging system, where the control plane charging request information is sent by the charging system after receiving the forwarding plane charging statistics.

Optionally, the control plane charging information includes the control plane charging information before the change and/or control plane charging information after the change.

In still another optional implementation, the control plane network element 9 may further include a processing module 92. The processing module 92 is configured to determine whether the control plane charging information changes. The sending module 91 is configured to send a second control plane message to the forwarding plane network element when the control plane charging information changes, so that the forwarding plane network element sends the forwarding plane charging statistics to the charging system based on the second control plane message.

Optionally, the control plane network element 9 may further include a receiving module 93, configured to receive the control plane charging request information sent by the charging system. The sending module 91 sends the control plane charging information to the charging system after the receiving module 93 receives the control plane charging request information sent by the charging system, where the control plane charging request information is sent by the charging system after receiving the forwarding plane charging statistics.

Optionally, the control plane charging information includes the control plane charging information before the change and/or control plane charging information after the change.

In still another optional implementation, the forwarding plane charging statistics are sent by the forwarding plane network element when the forwarding plane charging statistics meet a preset charging trigger condition.

Optionally, the control plane network element 9 may further include a receiving module 93, configured to receive the control plane charging request information sent by the charging system. The sending module 91 sends the control plane charging information to the charging system after the receiving module 93 receives the control plane charging request information sent by the charging system, where the control plane charging request information is sent by the charging system after receiving the forwarding plane charging statistics.

The charging processing includes offline charging CDR generation, or online charging quota authorization.

The forwarding plane network element may further send a charging context identifier to the charging system, and the first or second control plane message may carry the charging context identifier, so that the charging system associates the forwarding plane charging statistics with the control plane charging information based on the charging context identifier of the forwarding plane network element and the control plane network element, where the charging context identifier includes at least one of a service flow identifier, IP information of a service flow, or a charging group or a rate identifier associated with one or more to-be-charged service flows.

It should be noted that a function of each function module of the control plane network element 9 in this embodiment may be implemented according to the methods in the foregoing method embodiments, and may be corresponding to related descriptions in the method embodiments in FIG. 1 to FIG. 4. Details are not described herein again.

Figure 10:
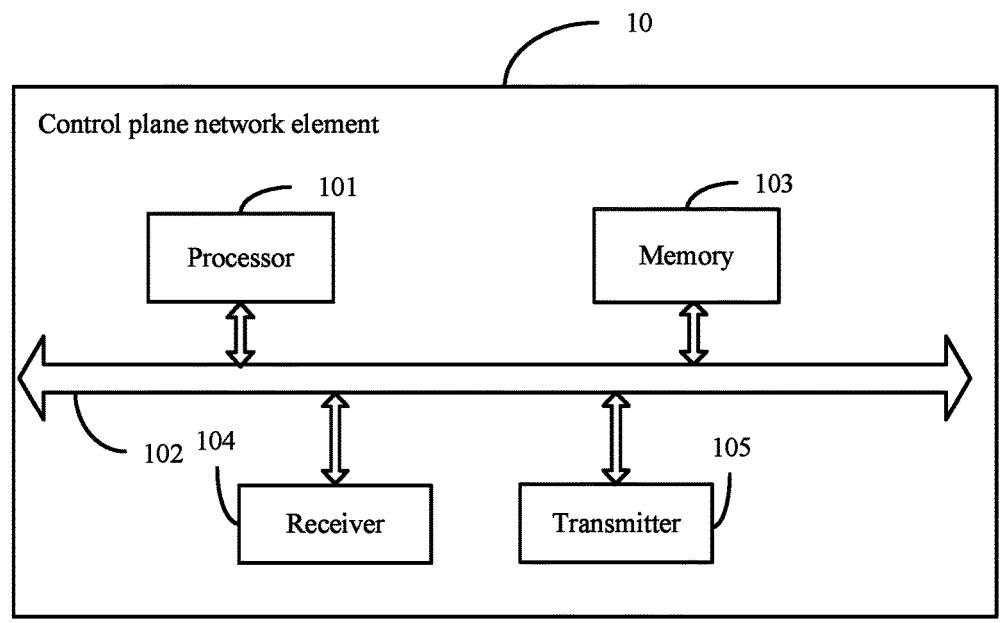
FIG. 10 is a schematic structural diagram of another control plane network element according to a tenth embodiment of the present invention.

Referring to FIG. 10, FIG. 10 is a schematic structural diagram of another control plane network element according to a tenth embodiment of the present invention. As shown in FIG. 10, the control plane network element 10 may include: at least one processor 101, at least one communications bus 102, a memory 103, a receiver 104, and a transmitter 105. The communications bus 102 is configured to implement connection and communication between these components. The memory 103 may be a high-speed RAM memory or a non-volatile memory, such as at least one magnetic disk memory. Optionally, the memory 103 may alternatively be at least one storage apparatus far away from the processor 101.

It can be understood that in this implementation, a function implemented by the control plane network element 10 may be implemented according to the methods in the method embodiments shown in FIG. 1 to FIG. 4, and may be corresponding to related descriptions in FIG. 1 to FIG. 4. Details are not described herein again.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A charging method comprising:
   collecting, by a forwarding plane network element, forwarding plane charging statistics;
   when the forwarding plane charging statistics meet a preset charging trigger condition, sending, by the forwarding plane network element, the forwarding plane charging statistics to a charging apparatus using an interface between the forwarding plane network element and the charging apparatus, wherein the forwarding plane charging statistics are used by the charging apparatus for a charging processing; and
   sending, by the forwarding plane network element, a charging context identifier to the charging apparatus for associating the control plane charging information and the forwarding plane charging statistics, wherein the charging context identifier comprises one or more of the following: a service flow identifier, IP information of a service flow, a charging group and a rate identifier associated with one or more to-be-charged service flows.

2. The method according to claim 1, wherein before sending the forwarding plane charging statistics, the method further comprises:
receiving, by the forwarding plane network element, a request for collecting the charging statistics from the charging apparatus.

3. The method according to claim 2, wherein the request carries at least control plane charging information.

4. The method according to claim 3, further comprising:
sending, by the forwarding plane network element, the control plane charging information to the charging apparatus.

5. The method according to claim 1, further comprising:
receiving, by the forwarding plane network element, a charging rule from the charging apparatus;
wherein collecting the forwarding plane charging statistics comprises:
collecting, by the forwarding plane network element, the charging statistics based on the charging rule.

6. The method according to claim 1, wherein the charging processing comprises offline charging data record (CDR) generation, or online charging quota authorization.

7. The method according to claim 1, further comprising:
sending, by the forwarding plane network element, the charging context identifier to the charging apparatus, wherein the charging context identifier comprises at least one of the service flow identifier, IP information of the service flow, the charging group or the rate identifier associated with the one or more to-be-charged service flows, and the charging context identifier is used for association between the control plane charging information and the forwarding plane charging statistics.

8. A charging method comprising:
receiving, by a charging apparatus, forwarding plane charging statistics from a forwarding plane network element using an interface between the forwarding plane network element and the charging apparatus;
receiving, by the charging apparatus, a charging context identifier from the forwarding plane network element or the control plane network element, wherein the charging context identifier comprises one or more of the following: a service flow identifier, IP information of a service flow, a charging group and a rate identifier associated with one or more to-be-charged service flows;
associating, by the charging apparatus, the forwarding plane charging statistics with the control plane charging information based on the charging context identifier; and
performing, by the charging apparatus, a charging process based on the forwarding plane charging statistics and control plane charging information.

9. The method according to claim 8, wherein before receiving the forwarding plane charging statistics, the method further comprises:
receiving, by the charging apparatus, a control plane message from a control plane network element; and
in response to the control plane message, sending, by the charging apparatus, a request for collecting the forwarding plane charging statistics to the forwarding plane network element.

10. The method according to claim 9, wherein the control plane message carries the control plane charging information.

11. The method according to claim 8, further comprising:
receiving, by the charging apparatus, the control plane charging information from the forwarding plane network element.

12. The method according to claim 8, wherein after receiving the forwarding plane charging statistics, the method further comprises:
sending, by the charging apparatus, a request for the control plane charging information to the control plane network element; and
receiving, by the charging apparatus, the control plane charging information from the control plane network element.

13. The method according to claim 8, further comprising:
sending, by the charging apparatus, a charging rule to the forwarding plane network element.

14. A charging method comprising:
detecting, by a control plane network element, that control plane charging information changes;
sending, by the control plane network element in response to the detection, the changed control plane charging information to a charging apparatus using an interface between the control plane network element and the charging apparatus, wherein the control plane charging information is used by the charging apparatus for a charging processing; and
sending, by the control plane network element, a charging context identifier to the charging apparatus for associating the control plane charging information and the forwarding plane charging statistics, wherein the charging context identifier comprises one or more of the following: a service flow identifier, IP information of a service flow, a charging group and a rate identifier associated with one or more to-be-charged service flows.

15. The method according to claim 14, further comprising:
sending, by the control plane network element, a first control plane message to the forwarding plane network element, wherein the first control plane message triggers transmission of forwarding plane charging statistics to the charging apparatus.

16. The method according to claim 14, further comprising:
sending, by the control plane network element, a second control plane message to the charging apparatus in response to the detection, wherein the second control plane message triggers a request of the forwarding plane charging statistics.

17. The method according to claim 14, wherein before sending the control plane charging information to the charging apparatus, the method further comprises:
receiving, by the control plane network element, a request for the control plane charging information from the charging apparatus.

18. The method according to claim 14, further comprising:
sending, by the control plane network element, the charging context identifier to the charging apparatus, wherein the charging context identifier comprises at least one of the service flow identifier, IP information of the service flow, the charging group or the rate identifier associated with the one or more to-be-charged service flows, and the charging context identifier is used for association between the control plane charging information and the forwarding plane charging statistics.

* * * * *